(12) United States Patent
Zhou

(10) Patent No.: US 6,724,837 B1
(45) Date of Patent: Apr. 20, 2004

(54) TIMING ESTIMATION FOR GSM BURSTS BASED ON PAST HISTORY

(75) Inventor: Hai Zhou, Grange Park (GB)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/418,463

(22) Filed: Oct. 15, 1999

(30) Foreign Application Priority Data

Oct. 19, 1998  (EP) .............................................. 98308514

(51) Int. Cl.[7] .............................. H03D 1/00; H03L 7/00; H04J 3/06
(52) U.S. Cl. ........................ 375/343; 375/366; 375/368; 375/355; 370/509; 370/511
(58) Field of Search ................................ 375/343, 206, 375/340, 316, 137, 142, 145, 143, 149, 150, 231, 355, 359, 366, 368; 370/335, 320, 342, 441, 479, 515, 509–514

(56) References Cited

U.S. PATENT DOCUMENTS

| 4,669,091 A | 5/1987 | Nossen ......................... 375/14 |
| 5,648,991 A | 7/1997 | Mamekata et al. ......... 375/341 |
| 5,740,206 A | 4/1998 | Lomp et al. ................. 375/346 |
| 5,838,672 A | * 11/1998 | Ranta ......................... 370/335 |
| 5,999,561 A | * 12/1999 | Naden et al. ............... 375/206 |
| 6,341,226 B1 | * 1/2002 | Yamamoto et al. ......... 455/525 |

FOREIGN PATENT DOCUMENTS

WO          WO 94/18752          8/1994          ............ H03D/1/00

* cited by examiner

Primary Examiner—Young T. Tse
Assistant Examiner—Sam K. Ahn
(74) Attorney, Agent, or Firm—Steve Mendelsohn; Yuri Gruzdkov

(57) ABSTRACT

A method and apparatus for estimating the timing position of data bursts received in a data stream, where each data burst includes a number of bits comprising a training sequence in a fixed location. The receiver includes circuitry for estimating the timing position of the data bursts received in the data stream. For each of the first N received data bursts, the receiver estimates a plurality of timing locations of the training sequence, correlates the training sequence for each estimated timing location, and determines the timing location associated with the highest correlation value. The receiver then determines the average timing location of the highest correlation values for each of the first N data bursts. For the next M data bursts the receiver estimates the timing location of each data burst based on the average timing location for the first N data bursts.

12 Claims, 6 Drawing Sheets

TIMING ESTIMATION FOR GSM BURSTS BASED ON PAST HISTORY

CROSS-REFERENCE TO RELATED APPLICATION

This application claims priority of European Patent Application No. 98308514.3, which was filed on Oct. 19, 1998.

FIELD OF THE INVENTION

The present invention relates to the tracking of a training sequence in a transmitted radio signal, and particularly but not exclusively to the tracking of training sequences in data bursts in GSM systems. The invention is particularly advantageous when applied in highly noisy environments in which there is a low signal-to-noise ratio.

BACKGROUND TO THE INVENTION

In any radio communications system intersymbol interference (ISI) is caused in the radio path by reflections from objects far away from the receive antenna. The symbols become spread out in time and adjacent symbols interfere with each other. The receiver of the radio communications system must then determine the information that was intended to be sent.

In a GSM system, data is transmitted in bursts, which are placed within timeslots. A training sequence of a known pattern and with good autocorrelation properties is placed in the middle of the data burst. The training sequence is placed in the middle of the burst in order to provide correct channel estimation for the first and the second half of the burst. The position of the received burst in time varies from burst to burst, due to changes in the propagation channel and movement of the mobile station.

In a GSM system a channel equalizer is provided in the receiver. The purpose of the equalizer, placed in the path of the received signal, is to reduce the ISI and multi-path effects as much as possible to maximise the probability of correct decisions. The channel equalizer uses the training sequence in the burst to equalize the multi-path effects. In order to perform the equalization effectively, the receiver must first identify the exact position of the training sequence.

The training sequence is used by the equalizer to create a channel model, which changes all the time but which during one burst can be regarded as constant for a slowly varying channel in time. If two similar interfering signals arrive at the receiver at almost the same time, and if their training sequences are the same, there is no way to distinguish the contribution of each to the received signal. For this reason, different training sequences are allocated to channels using the same frequencies in cells that are close enough so that they do not interfere. When two training sequences differ, and are as little correlated as possible, the receiver can much more readily determine the contribution of each to the received signal.

The receiver knows the training sequence which the transmitter of the radio communications system transmits, and stores such training sequence. By correlating the stored training sequence with the training sequence received from the transmitter, the channel impulse response can be measured. The equalizer creates a model of the transmission channel and calculates the most probable receiver sequence. Conceptually, the equalizer takes the different time-dispersed components, weighs them according to the channel characteristics, and sums them after inserting the appropriate delay between components, so that a replica of the transmitted signal is restored.

The problem in cellular radio becomes more complex due to the dynamic nature of the channel. As the mobile moves through multipath surroundings, the equalizer must continually adapt to the changed channel characteristics. The equalizer knows the transmitted training sequence, and also knows what it has actually received. Thus, the equalizer can make an estimate of the channel transfer function. Thus an adaptive equalizer continuously updates the transfer function estimate, making sure that the decision error does not increase too much during the channel transmission.

In conventional systems, timing estimation is obtained by correlating a data burst with a training sequence stored in the base station. The base station knows the training sequence used by the mobile station. Correlations are performed at various bit positions of the received signal. The bit position that provides the highest correlation value is determined to be the first bit of the training sequence. The received data burst can then be effectively equalized to compensate for the channel.

However, this known technique suffers significantly from the effects of multipath delays in very noisy environments in which there is a low signal-to-noise ratio. Performing the correlation before the equalization leads to errors in timing estimation, and hence bit errors at the output of the equalizer.

It is therefore an object of the present invention to provide an improved technique for estimating the timing position of received data bursts, which operates reliably even in noisy environments.

SUMMARY OF THE INVENTION

According to the present invention, in one aspect there is provided a method of estimating the timing position of data bursts received in a data stream, each data burst including a number of bits comprising a training sequence in a fixed location, the method comprising the steps of: for each of the first N received data bursts: determining a plurality of estimated timing locations of the training sequence; correlating the training sequence for each estimated timing location; determining the timing location associated with the highest correlation value; determining the average timing location of the highest correlation values for each of the first N data bursts; and for the next M data bursts: estimating the timing location of each data burst based on the average timing location for the first N data bursts.

There is thus provided a technique for estimating the timing position of data bursts which offers significant performance improvements in noisy environments.

Preferably the method further comprises the steps of: for each of the first N data bursts, equalizing the data burst based on the timing location associated with the highest correlation value; and for the next M bursts, equalizing each data burst based on the average timing location determined for the first N data bursts.

Preferably the method further comprises the step of determining the average timing location includes allocating a weighting to each timing location associated with the highest correlation values.

The weighting is preferably allocated to each timing location in dependence on the level of the associated correlation value.

In a further aspect the invention provides a receiver for synchronizing data bursts received in a data stream, each data burst including a number of bits comprising a training sequence in a fixed location, the receiver including circuitry for estimating the timing position of the data bursts received in the data stream, wherein for each of the first N received data bursts, the receiver estimates a plurality of timing locations of the training sequence, correlates the training sequence for each estimated timing location, determines the timing location associated with the highest correlation value, and determines the average timing location of the highest correlation values for each of the first N data bursts; and for the next M data bursts the receiver estimates the timing location of each data burst based on the average timing location for the first N data bursts.

DESCRIPTION OF PREFERRED EMBODIMENT

Figure 1A:
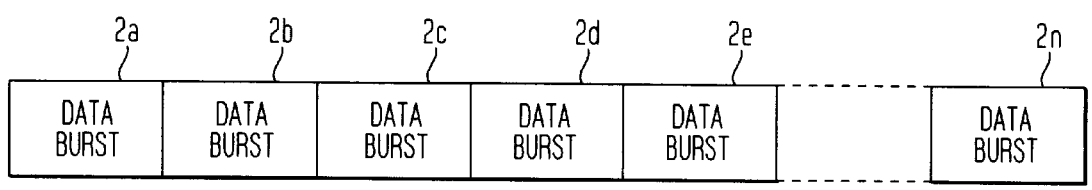
FIG. 1(a) shows the structure of a data stream of a GSM system comprising a number of data bursts.

Referring to FIG. 1(a) there is shown an overview of the basic structure of a typical GSM transmitted signal. As can be seen, the transmitted signal comprises a plurality of data bursts 2a to 2n. There are five different kinds of bursts in a GSM system: normal burst, synchronization burst, frequency correction burst, access burst, and dummy burst. Each burst is 156.25 bits long. The present invention applies to any burst containing a training sequence for equalizing the burst. The length of the training sequence varies according to the type of data burst. In a normal data burst the training sequence is 26 bits long.

In practice, transmitted messages are preceded by access bursts during the set-up phase of a transmission. The receiving station therefore initially seeks a training sequence of an access burst. Thereafter, the message includes a plurality of normal data bursts, and the receiving station seeks a training sequence of a normal data burst. The extraction of bursts from a transmitted message will be well understood by one skilled in the art and is outside the scope of the present invention.

Figure 1B:
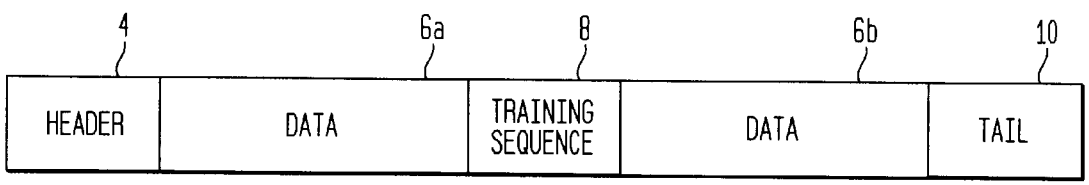
FIG. 1(b) shows the structure of a GSM normal data burst.

Referring to FIG. 1(b), it can be seen that each normal data burst comprises a header portion 4, a first data portion 6a, a training sequence 8, a second data portion 6b, and a tail portion 10. The format and generation of each portion of the data burst of FIG. 1(a) will be well known to those skilled in the art.

Figure 2:
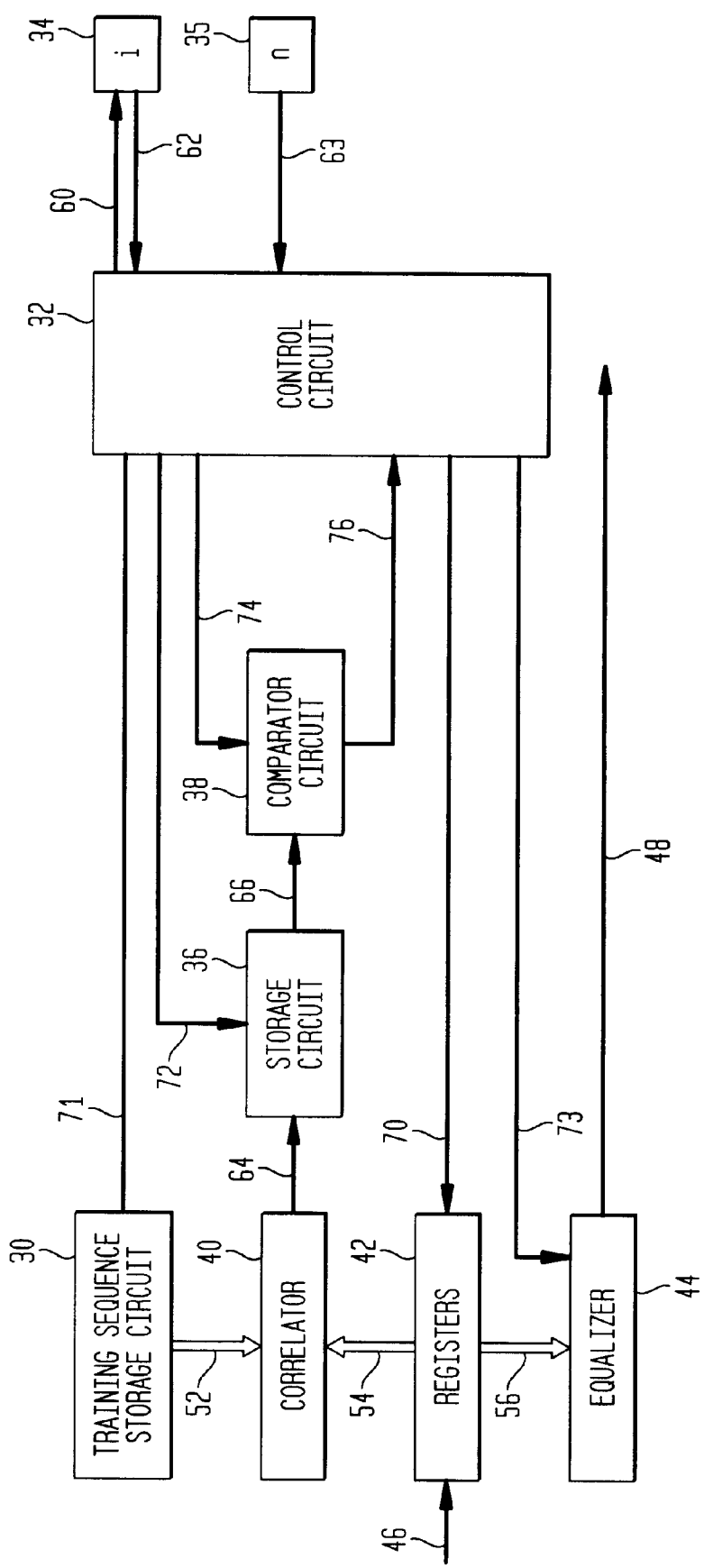
FIG. 2 is a block diagram illustrating the main components of a conventional circuit for performing equalization of a GSM data burst.

Referring to FIG. 2, there is shown a block schematic of equalization circuitry for performing the conventional equalization process in the receiver of a GSM mobile and GSM Base Station.

The equalization circuitry receives a data stream including data bursts as illustrated in FIG. 1 on a signal line 46 from the receive antenna. The equalization circuitry outputs the equalized data stream to be further processed in the receiver on a signal line 48.

The receive antenna, and the pre-processing circuitry (such as down-converter) which the received signal must go through prior to equalization is not shown in FIG. 2. Such circuitry is beyond the scope of the present invention and the implementation thereof will be within the capabilities of one skilled in the art.

The equalization circuitry includes a control circuit 32, a training sequence storage circuit 30, a correlator 40, a set of registers 42, an equalizer 44, a storage circuit 36, a comparator circuit 38, a counter 34, and a value store 35.

The operation of the circuitry of FIG. 2 will now be described in conjunction with the flow diagram of FIG. 3, which illustrates the steps performed in a conventional equalization process.

The equalization circuit receives the stream of data on signal line 46, and the received stream of data is shifted into the set of registers 42 under the control of a signal line 70 from the control circuit 32. The set of registers 42 are capable of storing a number of bits in excess of the number of bits in a data burst.

Figure 3:
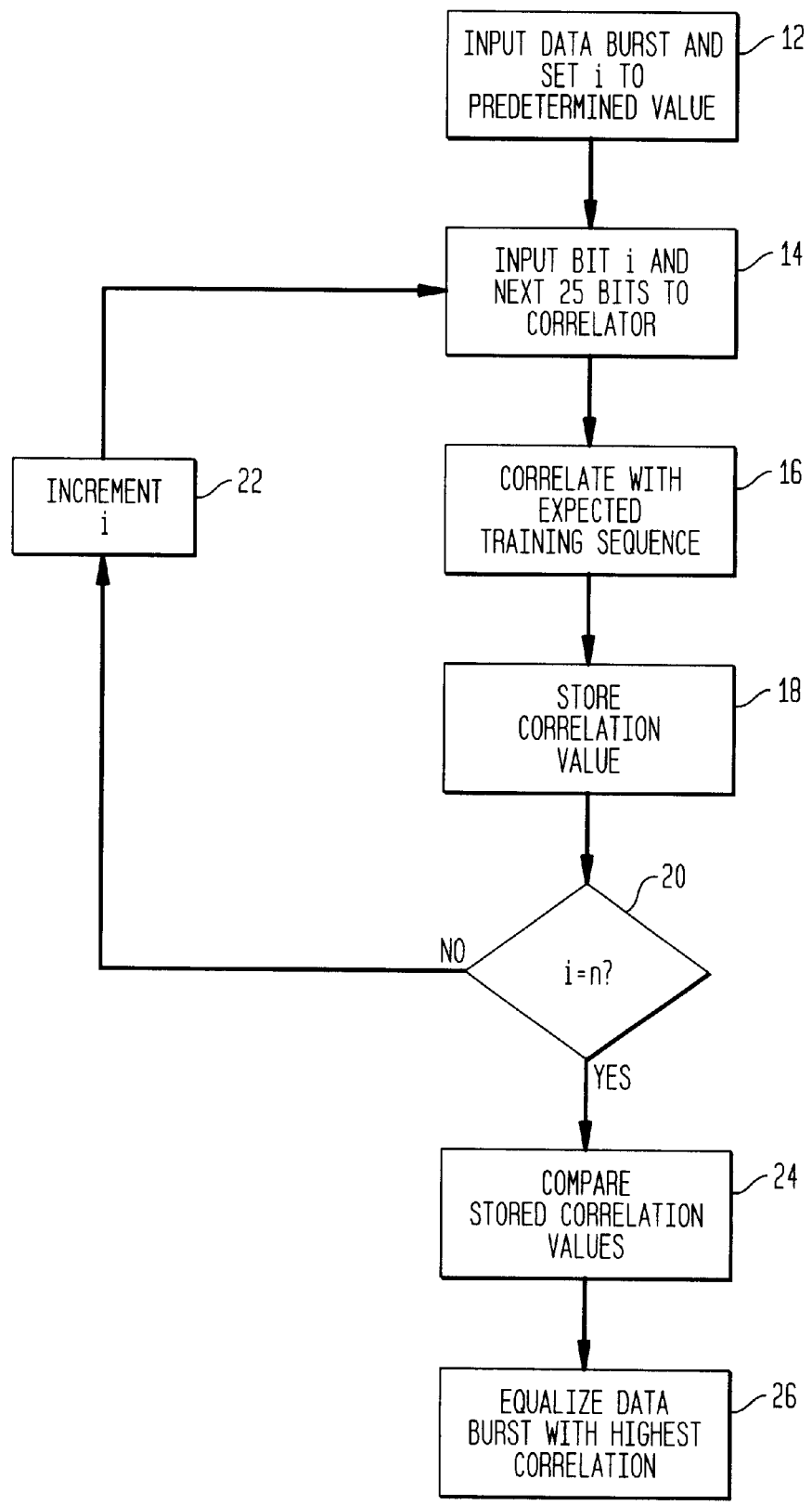
FIG. 3 is flow diagram illustrating the operation of the circuit of FIG. 2.

When the control circuit 32 has filled the set of registers 42 with the incoming data stream, in a step 12 of FIG. 3 the control circuit sets a signal on line 60 to set a value i in the counter 34. The value i in the counter is the bit position of the data stored in the set of registers 42 which it is estimated by the receiver is the first bit of the training sequence of the first data burst. This estimate of the bit position is predetermined.

In a next step 14, the receiver transfers the contents of the bit location i, and the next successive 25 bit locations of the received data stream (which comprise the 26 bits of the estimated training sequence in a GSM normal data burst), into the correlator 40 from the set of registers 42 via 26 bit parallel signal lines 54 under the control of the signals 70. The correlator also receives, on 26 bit parallel signal lines 52 the training sequence stored in the receiver in the training sequence storage circuit 30, which is the training sequence which the receiver expects to receive.

The correlator 40 then correlates, in a step 16, the estimated training sequence on parallel lines 54 with the stored training sequence on parallel lines 50. The receiver will therefore correlate the bit i and the next successive 25 bits of the received signal with the 26 bits of the training sequence storage circuit 30.

The result of this correlation is output on line 64, and in a step 18 the result is stored in the storage circuit 36 under the control of the signal 72 from the control circuit.

The control circuit 32 of the receiver then determines, in a step 20, whether the value i in the counter 34 is equal to a value n stored in the value store 35 and read on line 63. The value n is the maximum value of i for which the correlation is to be performed. The control circuit 32 reads the contents of the counter 34 on line 62 and compares it to the stored value n on line 63.

If the control circuit 32 determines that the value i has not yet reached the value n, then the receiver moves onto step 22 and increases the value i in the counter 32 by setting the signal on line 60 as illustrated by step 22 in FIG. 3. The amount by which the value i is incremented will be predetermined.

The steps 14 to 20 of FIG. 3 hereinbefore described are then repeated, but with a different value of i such that a different estimate of the training sequence is output on line 54 and correlated with the contents of the training sequence storage circuit.

When the value i equals the value n in step 20 of FIG. 3, the control circuit 32 of the receiver controls the comparator circuit 38 via line 74 to compare the stored correlation values in the storage circuit 36. The stored correlation values are presented to the comparator circuit 38 on lines 66 under the control of control circuit 32 via line 72. This is illustrated by step 24 in FIG. 3. The comparator circuit compares the stored correlation results and determines the highest value.

The storage circuit 36 stores the correlation results together with the value i for which the correlation was performed. The comparator outputs the value i of the highest correlation result to the control circuit 32 on line 76. The correlation result that returns the highest value is estimated to be the value of i that is the first bit of the training sequence of the first data burst.

In a step 26 the control circuit 32 outputs the set of bits forming the first data burst from the set of registers associated with a training sequence having a first bit in the bit position i. This data burst is output on the lines 56 to the equalizer 44.

For instance, in the example described of a GSM normal data burst, the data burst is 156.25 bits long, and the first bit of the training sequence is the $62^{nd}$ bit of the normal data burst. The control circuit therefore can determine the first bit of the data burst once it knows the location of the first bit of the training sequence, and can select all the bits of the data burst. If, say, 200 bits have been stored in the set of registers 42, the control circuit selects the 156.25 bits of the normal data burst.

Responsive to a control signal on line 73 from the control circuit 32, the equalizer 44 then equalizes the received data burst. The data burst is equalized by the equalizer in a known manner in accordance with standard techniques to compensate for the propagation path of the channel. The equalized received data burst is then output on line 48 from the equalizer 44.

The equalization process removes the multi-path effects from the received signal. That is, the equalization process eliminates noise from the received signal and produces a clean version of it. The equalizer 44 is a matched filter.

The control circuit then shifts the first bit received in the set of registers 42 after the last bit of the first normal data burst to the most significant bit position of the set of registers, and then shifts in a further set of received bits into the set of registers until they are full. The above-described steps are then repeated to identify the training sequence of the second and further data bursts.

In the foregoing description the correlaton was described as performed on 26 bits selected from the received data on the basis that the example described was a normal data burst having a 26 bit raining sequence. It will be appreciated that the control circuit 32 will be controlled by a processor in the receiver such that if the incoming data burst is identified as a different type of burst having a different number of bits in the training sequence, the number of bits correlated will be altered and the training sequence stored in the training sequence storage circuit adjusted.

The conventional correlation and equalization technique described hereinabove with reference to FIGS. 2 and 3 may be applied in any receiver, whether the receiver is in a mobile station or a base station.

The operation of the improved equalization technique according to the present invention will now be described with reference to FIGS. 4 and 5.

Figure 4:
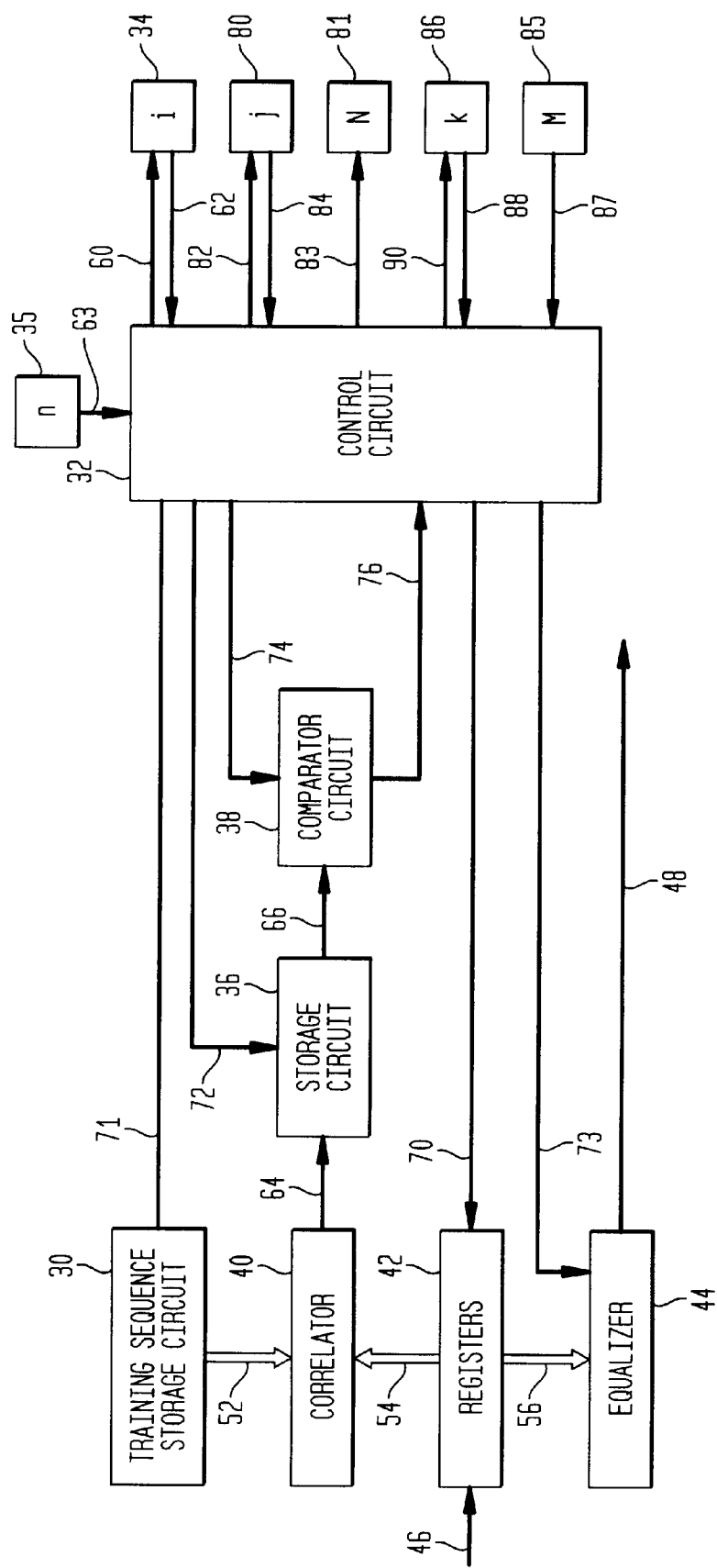
FIG. 4 is a block diagram illustrating the main components of a circuit for performing the equalization of a GSM data burst according to the present invention.

Referring to FIG. 4, there is shown a block schematic of circuitry for performing the equalization process in the receiver of a GSM mobile or a GSM Base Station according to the present invention. Like reference numerals are used in FIG. 4 to illustrate elements which correspond to elements shown in FIG. 2. The equalization circuit of FIG. 4 additionally includes counters 80 and 86, and value stores 81 and 85.

The receiver receives the data stream including data bursts as before on line 46, and outputs the equalized data bursts as before on line 48.

In an initial step 100, the control circuit sets the contents j of the counter 80 to 1 via line 82 on receipt of the first normal data burst. The counter 80 counts the number of data bursts received by the equalization circuitry.

The equalization circuit receives the stream of data on signal line 46, and the received stream of data is shifted into the set of registers 42 under the control of a signal line 70 from the control circuit 32. The set of registers 42, as before, are capable of storing a number of bits in excess of the number of bits in a data burst.

Figure 5A:
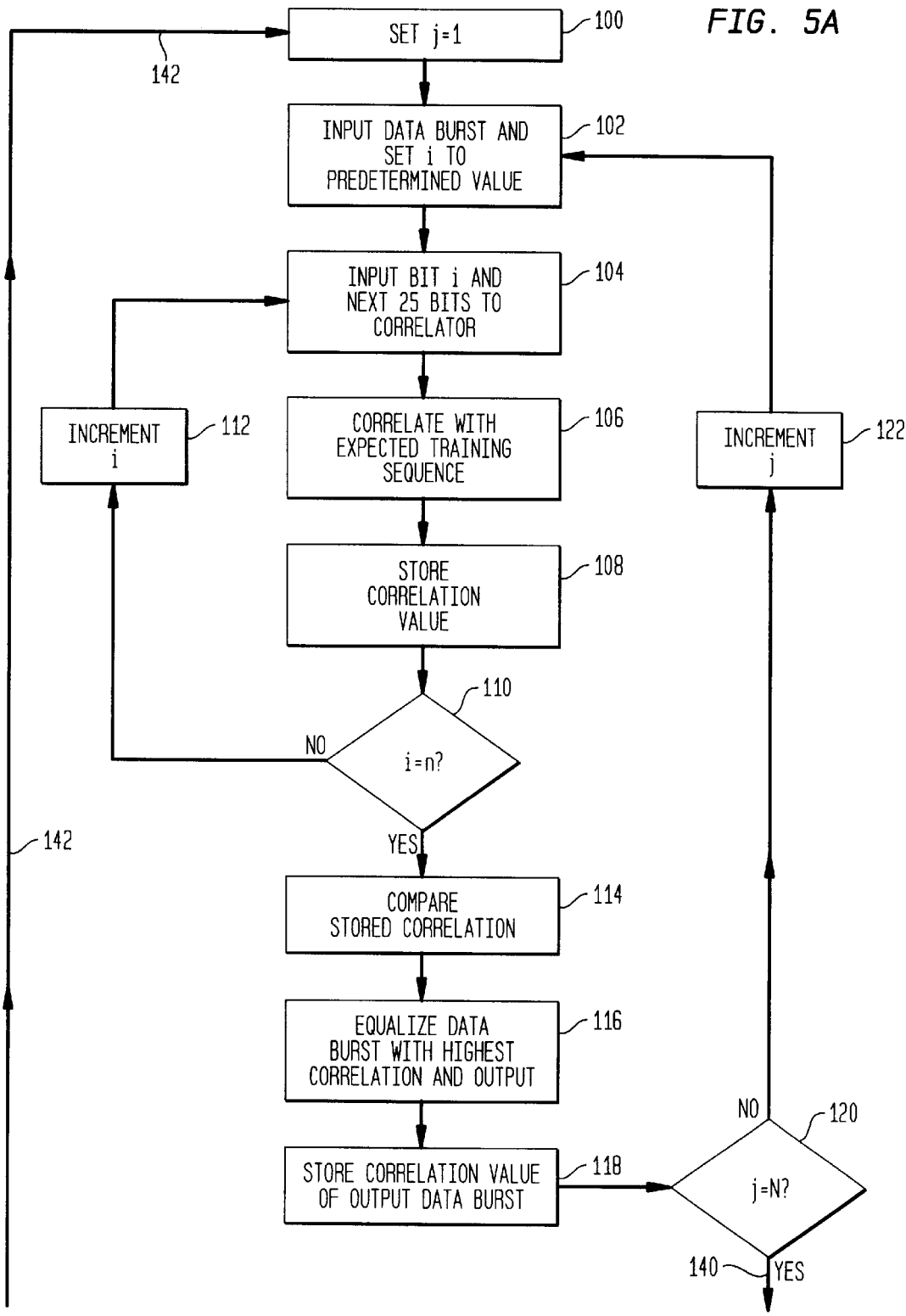
FIGS. 5(a) and 5(b) are flow diagrams illustrating the operation of the circuit of FIG. 4.
Figure 5B:
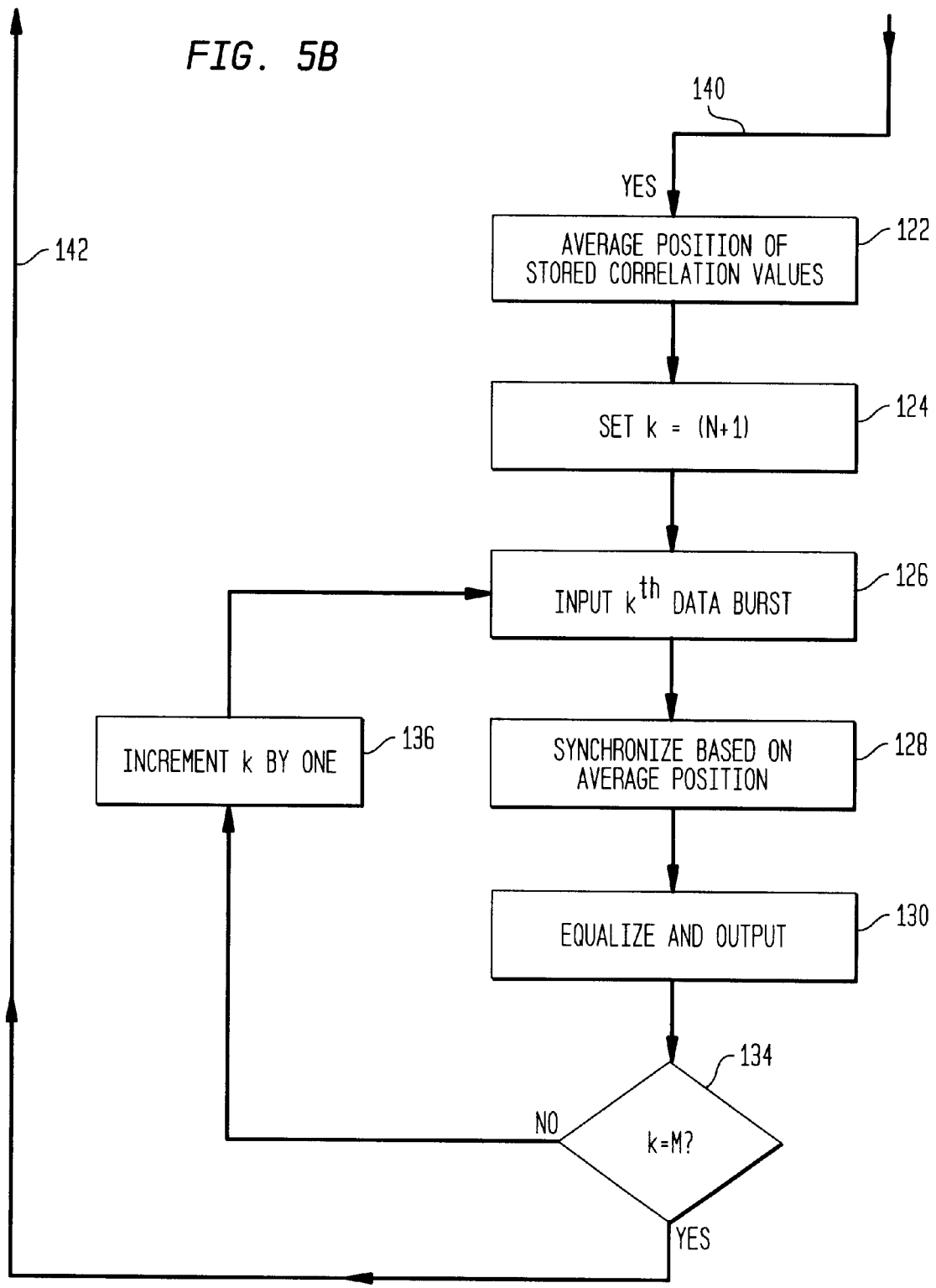

When the control circuit 32 has filled the set of registers 42 with the incoming data stream, in a step 102 of FIG. 5 the control circuit sets a signal on line 60 to set a value i in the counter 34. The value i in the counter is the bit position of the data stored in the set of registers 42 which it is estimated by the receiver is the first bit of the training sequence of the first data burst. This estimate of the bit position is predetermined.

In a next step 104, the receiver transfers the contents of the bit location i, and the next successive 25 bit locations of the received data stream (which comprise the 26 bits of the estimated training sequence in a GSM normal data burst), into the correlator 40 from the set of registers 42 via 26 bit parallel signal lines 54 under the control of the signals 70. The correlator also receives, on 26 bit parallel signal lines 52 the training sequence stored in the receiver in the training sequence storage circuit 30, which is the training sequence which the receiver expects to receive.

The correlator 40 then correlates, in a step 106, the estimated training sequence on parallel lines 54 with the stored training sequence on parallel lines 50. The receiver will therefore correlate the bit i and the next successive 25 bits of the received signal with the 26 bits of the training sequence storage circuit 30.

The result of this correlation is output on line 64, and in a step 108 the result is stored in the storage circuit 36 under the control of the signal 72 from the control circuit.

The control circuit 32 of the receiver then determines, in a step 110, whether the value i in the counter 34 is equal to a value n stored in the value store 35 and read on line 63. The value n is the maximum value of i for which the correlation is to be performed. The control circuit 32 reads the contents of the counter 34 on line 62 and compares it to the stored value n on line 63.

If the control circuit 32 determines that the value i has not yet reached the value n, then the receiver moves onto step 112 and increases the value i in the counter 32 by setting the signal on line 60. The amount by which the value i is incremented will be predetermined.

The steps 104 to 108 of FIG. 5 hereinbefore described are then repeated, but with a different predetermined value of i such that a different estimate of the training sequence is output on line 54 and correlated with the contents of the training sequence storage circuit.

When the value i equals the value n in step 110 of FIG. 5, the control circuit 32 of the receiver controls the comparator circuit 38 via line 74 to compare the stored correlation values in the storage circuit 36. The stored correlation values are presented to the comparator circuit 38 on lines 66 under the control of control circuit 32 via line 72. This is illustrated by step 114 in FIG. 5. The comparator circuit compares the stored correlation results and determines the highest value.

The storage circuit 36 stores the correlation results together with the value i for which the correlation was performed. The comparator outputs the value i of the highest correlation result to the control circuit 32 on line 76. The correlation result that returns the highest value is estimated to be the value of i that is the first bit of the training sequence of the first data burst.

In a step 116 the control circuit 32 outputs the set of bits forming the first data burst from the set of registers 42 associated with a training sequence having a first bit in the bit position i. This data burst is output on the lines 56 to the equalizer 44.

Responsive to a control signal on line 73 from the control circuit 32, the equalizer 44 then equalizes the received data burst. The data burst is equalized by the equalizer in a known manner in accordance with standard techniques to compensate for the propagation path of the channel. The equalized received data burst is then output on line 48 from the equalizer 44.

After the equalization step 116, in a step 118 the control circuit stores the correlation value of the equalized, output data burst in the storage circuit 36, together with the value i for which the data burst was equalized.

Then, in a step 120, the control circuit 32 checks the contents of the counter 80. In the step 120 the control circuit 32 reads the contents of the counter 80 on line 84 and compares it to a value N in value store 81. If the value j of the counter 80 does not equal the value N of the value store 81 then the control circuit proceeds to step 122.

In step 122 the control circuit increments the value j of the counter 80 by one by setting line 82. The control circuit 32 then, in step 104, inputs the next set of bits into the set of registers 42 that will form the second (j=2) data burst.

Again, the receiver selects a bit of the data stream as being a first possible candidate for the first bit of the training sequence of the second data burst based on the current value i in the counter 34. The bit location i is reset to the first predetermined value in step 122.

The steps 104 to 108 are then repeated, as before, until the value of i reaches n. Thus the second and successive data bursts are correlated for the same series of values of i.

As before, the receiver synchronises the data stream based on the correlation value determined in step 114 to be the highest, and equalizes the thus synchronised data burst in the step 116. The correlation value and value of bit i for the equalized data burst are again stored in the storage circuit 36 for the output equalized data burst.

The steps described above are repeated for successive data bursts until the value i equals the value N in step 120. The receiver thus repeats the steps on the first N data bursts received.

When, in step 120, the value j stored in the counter 80 reaches the value N, the control circuit moves onto a step 122, in which the correlation value of all i data bursts that have been equalized are evaluated. The bit positions i associated with each of the j equalized data bursts, stored in steps 118, are averaged to determine the position, on average, of the first bit of the training sequence for the first j data bursts equalized. The average value of i is then stored in storage circuit 36.

The control circuit then uses the average value of i for the first j data bursts as giving the best estimate as to the correct location of the first bit of the training sequence for the next M data bursts.

The step 122 may also include a weighting function in determining the average value of i. That is, the values of i may be weighted in accordance with the strength, or energy, of the correlation result with which they are associated.

In a next step 124, the control circuit sets a value k in value store 86 to (N+1) by setting line 83. In a step 126 the control circuit 32 then inputs into the set of registers 42 the kth, i.e. the (N+1)-th, data burst.

The kth data burst is synchronised in a step 128 according to the estimation for the location of the first bit of the training sequence made based on the average calculation made for the first N data bursts.

In a step 130, the (N+1)th data burst is then equalized and output on line 48. Thus no timing estimation is performed on the (N+1)th data burst.

In a step 134, after equalization, the control circuit 32 reads the value k of the counter 86 on line 88 and determines whether the value k matches a stored value M in value store 85 on line 87. If k does not equal M, then the value (N+1) of k in the counter 86 is incremented, in step 136, by one by setting line 88 and the next data burst, i.e. the (N+2)-th, is input into the set of registers 42.

The steps 126 to 134 are then repeated for the next M–N data bursts. That is for the next M–N data bursts the timing estimation based on the first N data bursts is used, no correlation being performed on these data bursts, only equalization.

When the (M+1)-th data burst is received, k=M in step 118 and the receiver reverts back to step 100 and the same estimation technique performed on the first N data bursts, and so the procedure is cyclical.

Thus, once the initial N bursts have been used to determine the timing of the received signal, only equalization is performed on the following M–N data bursts.

The value of M depends upon both the speed of the mobile station concerned and the rate of change in the propagation channel. Normally the effects of the former far outweigh the latter. A value of M=100 may be typically chosen, against a typical value of N=8.

During the first N data bursts bit errors may occur. This can be alleviated by reducing N after some initial equalizations if the propagation channel does not change significantly. In reality, 8 data bursts (N=8) lasts about 5 ms, and it is hardly noticeable even if all 8 data bursts are erased from any speech.

Because of constraints on processing and power resources, it is likely that the technique of the present invention will currently be applied only in communication system base stations. Employing the invention in current mobile stations would require additional processing capabilities, which are not currently available. However it is envisaged that future mobile stations will be able to support the present invention when the required processing and power capabilities are incorporated in mobile stations.

I claim:

1. A method of synchronizing data bursts received in a data stream, each data burst including a number of bits comprising a training sequence at a fixed location, the method comprising:

(A) for each of the first N received data bursts, where N>1:
  (i) selecting a plurality of estimated timing locations of the training sequence;
  (ii) correlating the training sequence for each estimated timing location; and
  (iii) determining the timing location associated with a highest correlation value;
(B) for the first N data bursts, determining an average timing location of the timing locations associated with the highest correlation values; and
(C) for each of the next M−N data bursts, where M>N:
  synchronizing each data burst based on the average timing location, wherein each of the next M−N data bursts is synchronized without correlating a training sequence from any of said M−N data bursts.

2. The method of claim 1, wherein:
step (A) further comprises:
  (iv) for each of the first N data bursts, equalizing the data burst based on the timing location associated with the highest correlation value; and
step (C) further comprises:
  for each of the next M−N bursts, equalizing each data burst based on the average timing location.

3. The method of claim 1 wherein step (B) includes weighting each timing location associated with the highest correlation value.

4. The method of claim 3 wherein the weighting is based on all energy level associated with the corresponding highest correlation value.

5. A receiver for synchronizing data bursts received in a data stream, each data burst including a number of bits comprising a training sequence at a fixed location, the receiver including circuitry for estimating the timing position of the data bursts received in the data stream, wherein the receiver is configured to:
(A) for each of the first N received data bursts, where N>1:
  (i) select a plurality of estimated timing locations of the training sequence;
  (ii) correlate the training sequence for each estimated timing location; and
  (iii) determine the timing location associated with a highest correlation value;
(B) for the first N data bursts, determine an average timing location of the timing locations associated with the highest correlation values; and
(C) for each of the next M−N data bursts, where M>N, synchronize each data burst based on the average timing location, wherein each of the next M−N data bursts is synchronized without correlating a training sequence from any of said M−N data bursts.

6. The receiver of claim 5, wherein the receiver is further configured to:
for each of the first N data bursts, equalize the data burst based on the timing location associated with the highest correlation value; and
for each of the next M−N bursts, equalize each data burst based on the average timing location.

7. The receiver of claim 5, wherein determining the average timing location includes weighting each timing location associated with the highest correlation value.

8. The receiver of claim 7, wherein the weighting is based on the energy level associated with the corresponding highest correlation value.

9. A communications system comprising a receiver for synchronizing data bursts received in a data stream, each data burst including a number of bits comprising a training sequence at a fixed location, the receiver including circuitry for estimating the timing position of the data bursts received in the data stream, wherein the receiver is configured to:
(A) for each of the first N received data bursts, where N>1:
  (i) select a plurality of estimated timing locations of the training sequence;
  (ii) correlate the training sequence for each estimated timing location; and
  (iii) determine the timing location associated with a highest correlation value;
(B) for the first N data bursts, determine an average timing location of the timing locations associated with the highest correlation values; and
(C) for each of the next M−N data bursts, where M>N, synchronize each data burst based on the average timing location, wherein each of the next M−N data bursts is synchronized without correlating a training sequence from any of said M−N data bursts.

10. The communications system of claim 9, wherein the receiver is further configured to:
for each of the first N data bursts, equalize the data burst based on the timing location associated with the highest correlation value; and
for each of the next M−N bursts, equalize each data burst based on the average timing location.

11. The communications system of claim 9, wherein determining the average timing location includes weighting each timing location associated with the highest correlation value.

12. The communications system of claim 11, wherein the weighting is based on all energy level associated with the corresponding highest correlation value.

* * * * *